United States Patent [19]

Mamaghani et al.

[11] Patent Number: 5,794,148
[45] Date of Patent: Aug. 11, 1998

[54] METHOD OF MAKING A CHANNEL EXIT DECISION IN A COMMUNICATION SYSTEM

[75] Inventors: Farzan Mamaghani, Bothell, Wash.; Karl Reardon, Surrey; David Dixon, Delta, both of Canada

[73] Assignee: Motorola, Inc., Schaumburg, Ill.

[21] Appl. No.: 879,394

[22] Filed: Jun. 20, 1997

Related U.S. Application Data

[63] Continuation of Ser. No. 332,002, Oct. 31, 1994, abandoned.
[51] Int. Cl.$^6$ .................................................. H04B 1/16
[52] U.S. Cl. ...................... 455/435; 455/513; 455/226.2
[58] Field of Search ........................... 455/450, 423, 455/62, 67.3, 517, 524, 226.2, 226.3, 434, 435, 432, 161.3, 166.2, 513

[56] References Cited

U.S. PATENT DOCUMENTS

| | | | |
|---|---|---|---|
| 4,481,670 | 11/1984 | Freeburg | 455/33 |
| 5,193,216 | 3/1993 | Davis | 455/226.2 |
| 5,278,991 | 1/1994 | Ramsdace et al. | 455/33.2 |
| 5,280,630 | 1/1994 | Wang | 455/62 |
| 5,444,862 | 8/1995 | Hibino | 455/52.1 |
| 5,491,834 | 2/1996 | Chia | 455/33.2 |
| 5,509,051 | 4/1996 | Barnett et al. | 455/33.2 |
| 5,566,366 | 10/1996 | Russo et al. | 455/343 |

*Primary Examiner*—Edward F. Urban
*Attorney, Agent, or Firm*—Pedro P. Hernandez

[57] ABSTRACT

In a data communications system operating on a registered data channel and including an infrastructure 100 and a subscriber terminal 115, a method of making a channel exit decision at the subscriber terminal includes: sampling 201 the registered data channel for a time period, preferably a signal time period and a data time each of which may be an adaptable time period to obtain a plurality of quality values, preferably signal values and data quality values; comparing 203, 213 each of the plurality of quality values to a threshold; and initiating 225 an exit procedure, preferably including a quick scan for a possible data channel, when a first number of the plurality of quality values obtained during the time period does not satisfy the threshold.

26 Claims, 5 Drawing Sheets

METHOD OF MAKING A CHANNEL EXIT DECISION IN A COMMUNICATION SYSTEM

This is a continuation of application Ser. No. 08/332,002, filed Oct. 31, 1994 and now abandoned.

FIELD OF THE INVENTION

The present disclosure concerns various subscriber roaming attributes or techniques and more particularly but not limited to such attributes, specifically concerning methods of making channel exit decisions.

BACKGROUND OF THE INVENTION

As our society becomes more mobile and information dependent the demand for untethered data communications continues to grow. A proliferation of radio data communications systems have been, are being, or will be deployed in an attempt to satisfy this demand. To no ones surprise, these systems, while often occupying or providing coverage to overlapping geographic areas and user groups, do not always lend themselves to providing, alternatively, relatively seamless data message delivery service to a particular subscriber's unit or terminal.

The systems, as deployed and planned, have sought to optimize different criteria depending on the system designers perception of what user groups needs are intended to be addressed by a particular radio data communications system. Such criteria have included various combinations of data message delivery capacity and delivery reliability, conservation of radio frequency spectrum, the economics of system deployment and expansion, and the extent of the desired geographic coverage. The process of optimization often relies on or takes advantage of expected or measured characteristics and content of data messages that are representative of probable system traffic. As a result of the above considerations at least two distinct types of systems, often referred to as a single frequency and multiple frequency reuse systems respectively, have evolved to provide data message delivery to user groups throughout a geographic area. This evolution is such that the present infrastructure from a collective or macro perspective for any one populous geographic region is now often referred to as a general frequency reuse system.

While distinct, both systems include some similar elements, functions, or characteristics. For example, both systems (networks) likely are centrally managed under the control of a network controller and include a plurality of fixed (base) stations arranged and managed to provide data message delivery to subscriber units or stations (portable or mobile terminals) throughout a geographic area. The network controller includes, among others, a data message routing function for selecting the appropriate path or point of origination, such as a base station, to attempt a data message delivery to a particular subscriber station. This path selection will depend in part on an estimate of the geographic location of the particular subscriber station or other system activity and may include when to attempt a data message delivery, which base station to utilize, and therefore, or additionally, which radio channel (a radio channel may represent two radio frequencies, one for receive and one for transmit).

One of these systems, referred to as a multi-frequency reuse (MFR) system, is characterized by typically comparatively small coverage areas with adjacent areas employing different radio channels, thus frequencies, and spatially distant areas reusing the same radio channels. The areas in total provide coverage throughout the intended MFR geographic area. Ordinarily the fixed stations, at least one per area, in this system are continuously transmitting and receiving and subscriber stations, such as portable or mobile stations or units are capable of operating on any legitimate and authorized network channel. The portable stations, by scanning the network channels, etc., can determine or aid in determining there location within the intended MFR geographic area on a more or less real time basis by observing the better quality channels based on signal strength, error rates, etc. The MFR network, although using several radio channels and thus frequencies, can provide significant data message delivery capacity since all areas may be simultaneously and independently active. Said another way, any path within the MFR system will, at least in principle, have a unique radio channel, i.e. frequency.

The second system, referred to as a single frequency reuse (SFR) system, is characterized by a multiplicity of coverage areas where all areas and potential paths are served by the same radio channel. As above, the areas in total provide coverage throughout the intended SFR geographic area. The fixed stations, usually one per area, in the SFR system are not ordinarily all simultaneously and independently active. To demonstrate, since all areas and paths operate on the same radio channel any two or more areas, when simultaneously active (respective fixed stations transmitting), will have an interference region. This region's geographic size and boundary will depend in part on the spatial separation, radio power levels, etc., of the respective base stations. Within this interference region a given portable station likely cannot resolve (successfully receive) a data message from either of the stations unless some further coordination of the base stations is undertaken.

In essence the effective coverage area depends at least in part on activity within other areas of the SFR system. Portable stations used in the SFR system need only operate on the assigned channel for the network and will not be able to directly aid in determining their location within the intended SFR geographic area unless and until an appropriate fixed station is enabled and uniquely identified. The SFR network tends to be viewed as a spectrally efficient and cost effective approach to providing coverage to a comparatively large geographic area. This follows from the limited number of frequencies employed and comparative simplicity of the portable stations, etc. Somewhat offsetting the above noted attributes, resulting from the single channel, interference regions, etc., a SFR system will typically have relatively limited data message delivery capacity and often more complicated data message routing functions.

The characteristics of either of these systems much less the characteristics of a combined system together with the growing popularity of data communications and hence number of subscriber units or stations or terminals mandates that the practitioner in the field pay careful attention to the particulars of a subscriber unit roaming from one geographic area to a second geographic area within a given system or roaming from one system to a second system.

Generally this topic may be called mobility management. Some straight forward approaches to mobility management have been discussed including, for example, at a subscriber unit simply keying up and transmitting some inquiry type message and waiting to see if anyone answers each and every time your unit is powered up or each time a data channel you are operating on becomes unsatisfactory. Unfortunately this is unsatisfactory because it waste valuable system capacity without delivering any data messages and further consumes a significant amount of battery capacity if the subscriber unit is battery powered, such as in the case of a portable unit. Additionally, due to the large number of potential channels or frequencies as well as data protocols, the time delay associated with this technique at its most basic renders the approach simply not practical.

Concerns such as these and practical considerations such as the fact that the subscriber unit rather than the network is likely to best know what data communications attributes and geographic particulars best serve the subscriber's needs as well as the economics of manufacturing a 'standard' subscriber unit has resulted in various other mobility management techniques that may be employed by subscriber units. Such techniques include a preloaded list of channels to scan or manually select when the presently used channel fails and must therefore be exited. Another includes a continual scan of possible frequencies on which to register and operate so that if the present registered channel degrades an undo amount the subscriber unit may exit such channel and may begin registration attempts on the other possible channels or frequencies. All such prior art techniques continue to be unsatisfactory for a generalized subscriber unit, either wasting system capacity, resulting in excess data message delivery latency, or consuming excess power, that is expecting to have data service on any of the plethora of various data communications networks. Clearly an urgent need exists for improved techniques that address mobility management and more particularly methods of making channel exit decisions.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
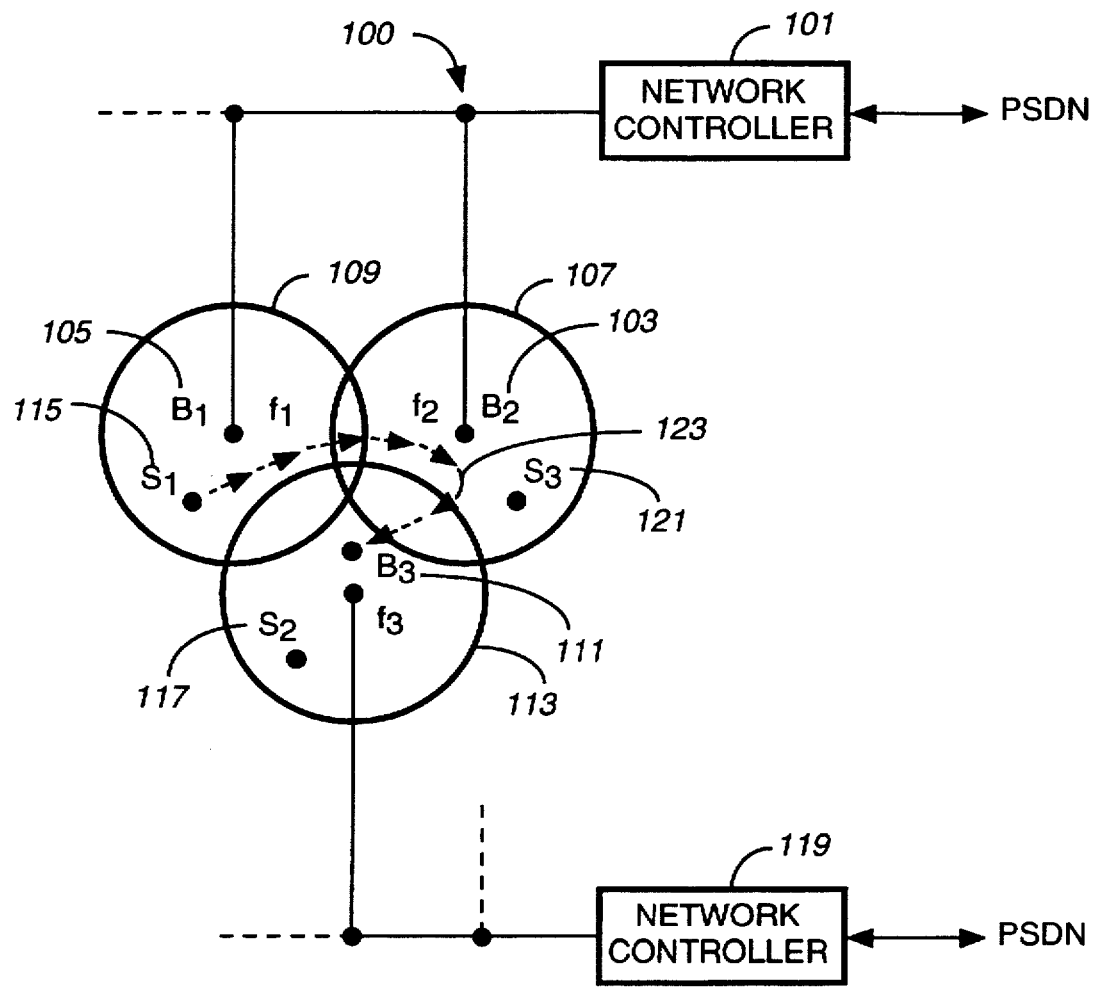
FIG. 1 is a representative diagram of a data communications system suitable for employing a method in accordance with the present invention.

Generally this disclosure deals with methods of making a channel exit decision in data communications systems, such as wireless or radio data communications systems, including, for example, systems relying on data links or channels for system management. The methods concern comparing samples of various operating or registered channel values or metrics to corresponding thresholds for corresponding time periods which time periods may be adaptable to circumstances surrounding prior exit decisions and taking exit oriented actions when all such samples within a corresponding time period are appropriately related to the corresponding threshold as well as various steps or procedures concerning such actions that are particularly time or system capacity efficient.

One preferred embodiment in a data communications system operating on a registered data channel and including an infrastructure and a subscriber terminal is a method of making a channel exit decision at the subscriber terminal that includes sampling the registered data channel for a time period to obtain a plurality of quality values or quality samples, comparing each of the plurality of quality values to a threshold or exit threshold, and initiating an exit procedure when a first number, preferably all, of the plurality of quality values obtained during the time period does not satisfy the threshold.

This method may further include the step of starting a timer that is set to lapse after the time period when any one quality value from the plurality of quality values does not satisfy the threshold and further resetting the timer when a second number of quality values from the plurality of quality values does satisfy the threshold. The time period may be an adaptable time period that, for example, is a function a time lapse or multiple time lapses between prior channel exit decisions.

The process step of initiating an exit procedure, preferably, includes a step of scanning for another data channel that includes, for example, sampling the another data channel to provide another quality value, comparing the another quality sample to an entry threshold, and exiting the registered data channel when the another quality sample satisfies the entry threshold. Exiting the registered data channel includes registration on a new data channel and that includes scanning of a list of data channels. Scanning a list of data channels includes forming a weighted quality value corresponding to each channel on the list of channels and prioritizing the each channel in accordance with the weighted quality value to form a prioritized channel list. To complete registration on a new data channel a step of initiating a registration procedure on a first priority channel from the prioritized channel list is effected. Initiating a registration procedure further includes attempting to register on the first priority channel, and re attempting to register on a next lower priority channel when the first attempting to register is unsuccessful.

Sampling the registered data channel, preferably, further includes both sampling the registered data channel to provide a plurality of signal strength values within a signal time period and to provide a plurality of data quality values within a quality time period. Each of the respective time periods may be adaptable and consider a time lapse between prior channel exit decisions. In this preferred embodiment the step of comparing further includes comparing each of the plurality of signal strength values to a signal threshold and each of the plurality of data quality values to a data threshold. The step of initiating an exit procedure may further include initiating an exit procedure when a first predetermined number of the plurality of signal strength values does not satisfy the signal threshold and providing another plurality of signal strength values when a second predetermined number of the plurality of signal strength values does satisfy the signal threshold. Additionally the initiating step may further include initiating an exit procedure when a third predetermined number of the plurality of data quality values does not satisfy the data threshold and providing another plurality of data quality values when a fourth predetermined number of the plurality of data quality values does satisfy the data threshold.

A further embodiment in accordance with the instant invention and in a similar context is a method of selecting at the subscriber terminal another data channel to register. This method includes sampling the registered data channel to obtain a quality metric that may be obtained as explained above, comparing the quality metric to a exit threshold, quick scanning, when the quality metric does not satisfy the exit threshold, sequentially a predetermined list of channels to provide a potential data channel with another quality value, preferably signal strength value, that satisfies a signal or entry threshold, exiting the registered data channel, scanning sequentially the predetermined list of channels further including forming for each of the predetermined list of channels a channel weight and ranking the predetermined list of channels in accordance with the channel weight for each channel to provide a ranked list of channels, and lastly attempting to register sequentially on each of the ranked list of channels until an attempt to register is successful.

Here also the quality metric may be derived as a function of an adaptable time period that adapts to or depends or is a function of a time lapse between prior subscriber unit registrations. The channel weight may be a function, for example, of signal strength for a corresponding channel or a function of other channel parameters. Some of these other channel parameters may include characteristics received from the infrastructure.

The instant invention may be more fully developed and appreciated with reference to the figures in which FIG. 1 depicts a representative diagram of a data communications system suitable for employing a method of making a channel exit decision in accordance with the present invention. The FIG. 1 data communications system depicts a first infrastructure 100 including a first network controller 101 that is coupled to a public switched data network (PSDN), such as the public switched telephone network, and to one or more base stations, such as base stations B1, B2, etc. 105, 103, etc. Exemplary versions of all equipment are available from suppliers or manufacturers such as Motorola Inc.

Generally the network controller controls the network or infrastructure and coordinates the delivery and receipt of messages to and from the base stations B1 and B2 and there respective origins and destinations. B1 105 has a geographic coverage area 109 within which it may deliver and receive messages from subscriber units, such as subscriber unit S1 115. The subscriber units are available from various manufacturers such as Motorola Inc. under various trade names such as InfoTac. Similarly B2 103 has a geographic coverage area 107 within which it may deliver and receive messages from subscriber units, such as S3 or S1 as S1 travels along the representative path 123. Similarly network controller 119 is coupled to the PSDN and a base station B3 111 and coordinates data message traffic on its respective infrastructure. B3 provides coverage over an area 113 and may provide service to subscriber units, such as S2 117 or S1 115 as it travels along path 123. The base stations B1 and B2 may operate on distinct frequencies f1 and f2 and be part of a multi-frequency reuse system while base station B3 may operate on f3 and be part of a single frequency reuse system. It is understood that FIG. 1 necessarily is a much simplified representative diagram and that actual systems are far more complicated.

Figure 2:
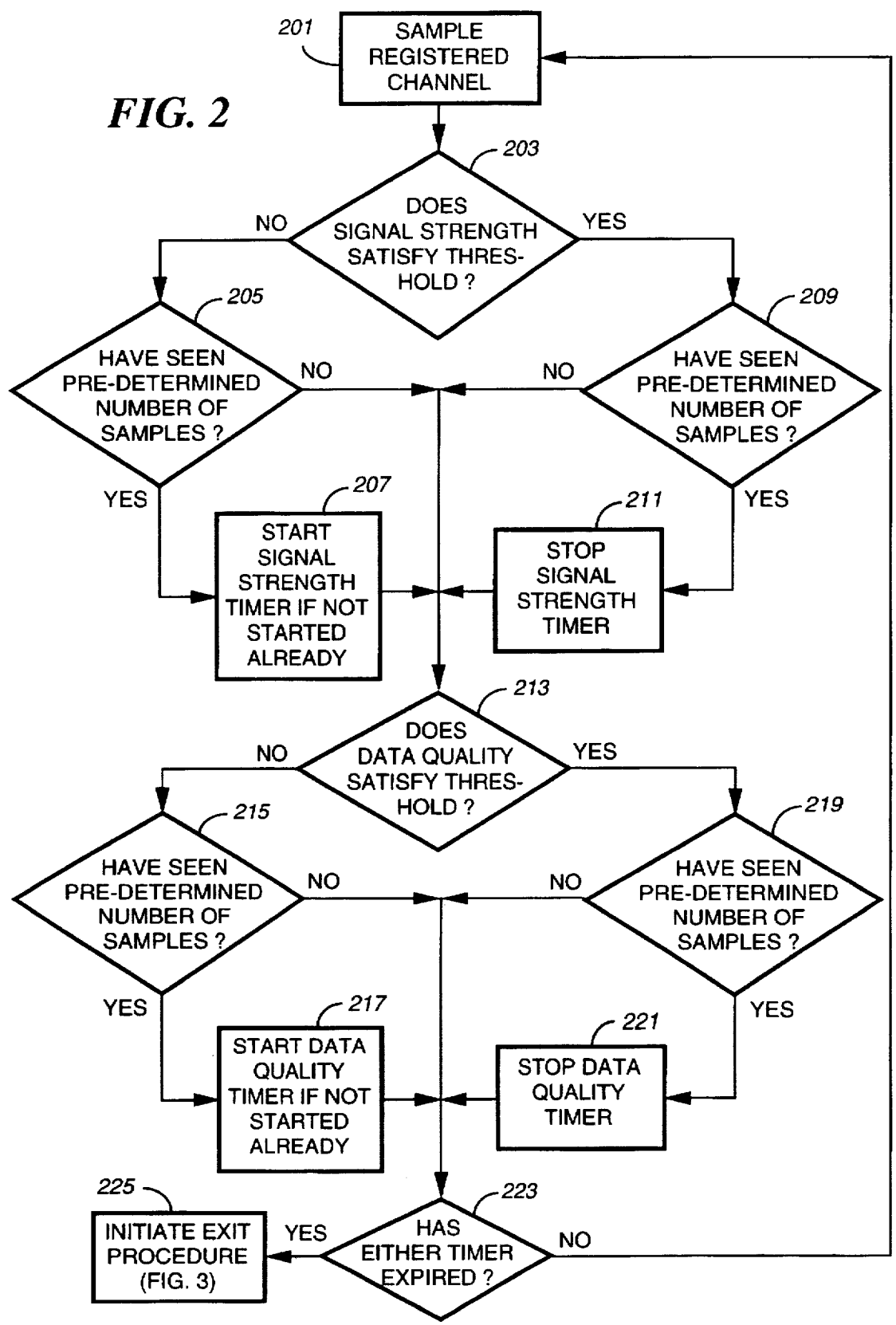
FIG. 2 is a demonstrative flow chart of a preferred embodiment of one method of making a channel exit decision in accordance with the instant invention.

For purposes of further explanation with reference to the FIG. 2 flow chart consider the situation observed by the subscriber unit S1 115 as it traverses the representative path 123. By observation B1 will initially be best able to provide service, then either B1 or B2, then B2 only, then B2 and B3, and eventually only B3. From time to time S1 will need to make one or more data channel exit decisions as well as select another data channel to subsequently register on.

Referring to FIG. 2 a preferred method embodiment of making a channel exit decision at the subscriber unit 115 as it traverses the path 123 in the communications system of FIG. 1 will be described. This method is suitable for execution by any general purpose or special purpose processor (not specifically shown but included as part of the subscriber unit) that has been programmed with the appropriate software and is interfaced with or controlling a receiver arranged to receive signals and assess signal strength, etc. This method begins at step 201 where the channel the subscriber unit is operating on, specifically the registered data channel is sampled to obtain a quality value or quality metric, more specifically a signal strength value and a data quality value. The signal strength value is an indication of the relative path loss between a base station and the subscriber unit at the time the sample is taken while the data quality value is an indication at the time taken of the relative data link quality and may be any number of assessments of bit error rate, such as a measured decoded BER for a synchronization string at the beginning of a data packet. Generally this sample will be taken each time the unit is awake and receiving the registered channel, preferably just prior to the end of the period when the unit is receiving the channel.

At steps 203, 213 the quality value or metric, specifically and respectively the signal strength value and data quality value is compared to a threshold, specifically and respectively a signal threshold and data threshold. If the signal threshold is not satisfied, step 205 determines whether a sufficient or predetermined number of "bad" samples, preferably one such sample, has been seen and if so step 207 starts a timer set to lapse after a time period, specifically a signal strength timer set to lapse after a signal time, if it is not already running. If the predetermined number of samples has not been seen or after step 207 the method proceeds to step 213 described above. If step 203 is satisfied the number of "good" samples, preferably two such samples, is compared to a predetermined number of such samples at step 209. If enough good samples have been observed the signal timer is stopped and reset to a corresponding time period, such as an adaptable signal time period at step 211. If enough "good" samples have not been seen or after step 211 the method proceeds to step 213 described above.

When the data quality does not satisfy the data threshold, step 215 determines whether a sufficient or predetermined number of "bad" samples, preferably one such sample, has been seen and if so step 217 starts a timer, specifically a data quality timer set to lapse after a quality time, if it is not already running. If the predetermined number of samples has not been seen or after step 217 the method proceeds to step 223. If step 213 is satisfied the number of "good" samples, preferably two such samples, is compared to a predetermined number of such samples at step 219. If enough good samples have been observed the quality timer is stopped and reset to a corresponding time period, such as an adaptable quality time period at step 221. If enough "good" samples have not been seen or after step 221 the method proceeds to step 223.

At step 223 the timer, more particularly a signal strength timer or data quality timer is tested to see if a time period, specifically and respectively a signal time period or quality time period has expired. These time periods, may be each or all an adaptable time period determined in accordance with FIG. 5 as further described herein below or a predetermined time period, preferably 96 seconds for the signal time period and 48 seconds for the quality time period. If none of the time periods have expired the methods cycles back to step 201 and repeats. Once a timer has expired as determined at step 223 the method proceeds to step 225 where an exit procedure, as further described below with reference to FIG. 3, is initiated.

In this fashion with repetitive trips through the FIG. 2 flow chart sampling of the registered data channel for a time period to obtain a plurality of quality values is accomplished. Further each of the plurality of quality values is compared to a corresponding threshold and ultimately when a first or predetermined number of the plurality of quality values, such as all or preferably all save two, do not satisfy the threshold an exit procedure is initiated. By using this method the exit procedure is initiated a first predetermined number of the plurality of signal strength values does not satisfy the signal threshold and another plurality of signal values is provided when a second predetermined number of the plurality of signal strength values does satisfy the signal threshold. Similarly the exit procedure is initiated when a third predetermined number of the plurality of data quality values does not satisfy the data threshold and another plurality of data quality values is provided when a fourth predetermined number of the plurality of data quality values does satisfy the data threshold.

Figure 3:
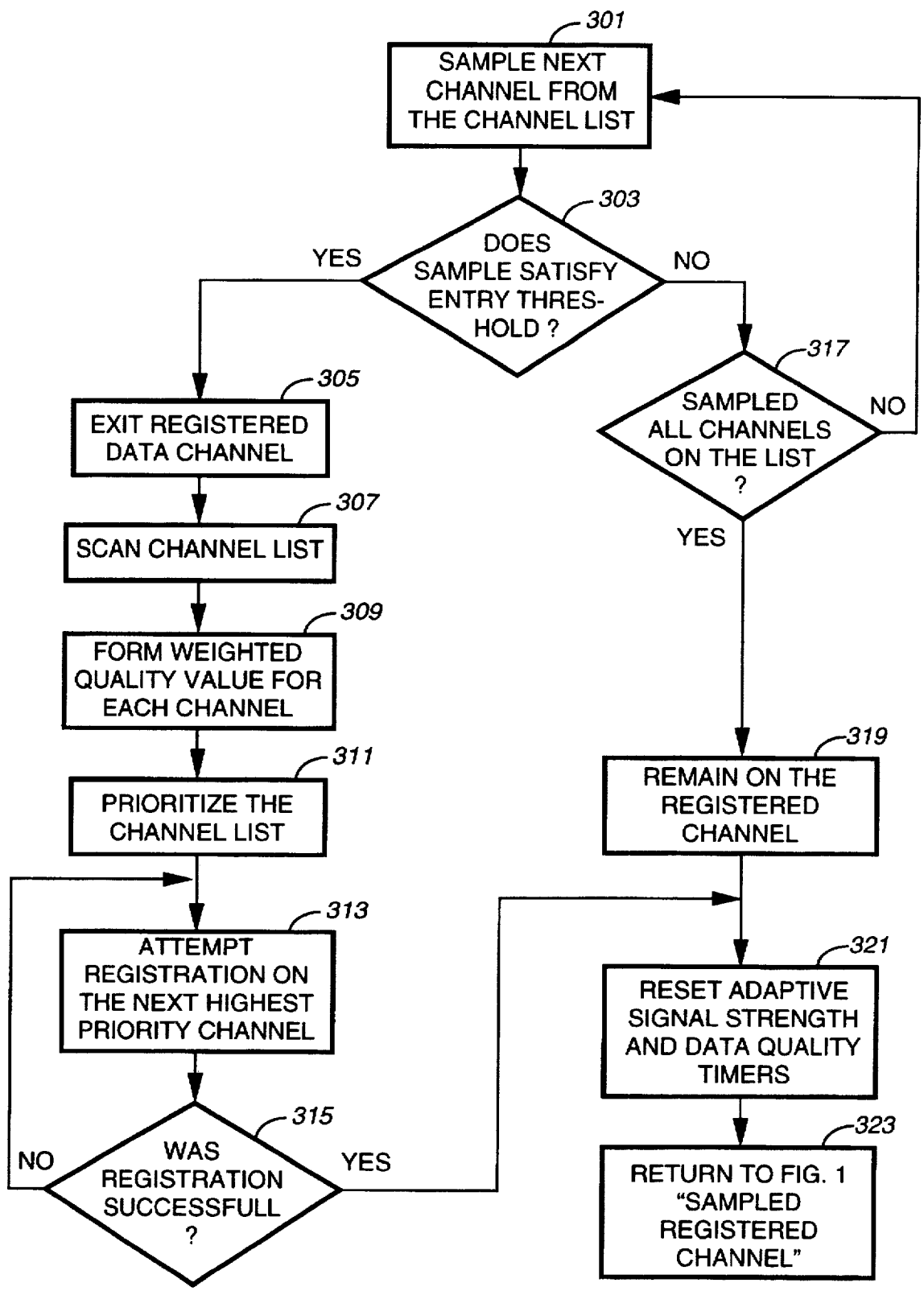
FIG. 3 is a demonstrative flow chart of a further method of exiting a channel in accordance with the instant invention.

Referring to FIG. 3 a preferred method embodiment of initiating the exit procedure will be described. Beginning at step 301, while still registered on the current registered data channel, the subscriber unit or terminal or radio will scan for another data channel by tuning to the next channel from the channel list maintained in the unit. The next channel will be sampled to obtain a quality metric, specifically signal strength value, and the sample will be compared to a threshold, specifically an entry threshold at step 303. This approach of sampling signal strength, allows the device to very rapidly sample other channels from the channel list (quick scan), therefore minimizing the time that is spent away from the current registered channel.

At step 303 the rapidly acquired quality metric, specifically the signal strength, is compared to the entry threshold, specifically the signal strength entry threshold. If the entry threshold is not satisfied, step 317 determines whether all the channels on the channel list (excluding the current registered data channel) have been sampled. If they have not all been sampled, the next channel on the list will be sampled by going back to step 301 as described above. If all the channels have been sampled with no channel satisfying the entry threshold, the device reverts back or remains on the current registered data channel in step 319. The signal timer and data quality timers tested in step 223 (FIG. 2), will be reset to there respective signal and quality time periods which may be adaptive time periods as determined in accordance with FIG. 5 discussed herein below. Then the method, at step 323, cycles back to step 201 of FIG. 2 and repeats.

If, at step 303, the signal strength sample does satisfy the entry threshold, the device knows that there is at least one other channel in the immediate geographic area with a better signal strength or quality metric than the current registered data channel. Thus the radio or device begins a procedure of registering on another data channel at step 305 where the current registered data channel is exited. In step 307 the channel list, including the channel just exited, are scanned to obtain a quality metric, specifically signal strength and data quality. In step 309 each channel is assigned a weighted quality value derived from the quality metric samples just collected, and other attributes of the channel, specifically whether the channel is for portable or mobile device usage, whether the channel is continuously keyed or intermittently keyed, etc. The weighted channels are prioritized in step 311, specifically the highest priority is assigned to the channel with the highest weight, the next highest priority is assigned to the channel with the next highest weight, and so on so as to form a prioritized channel list.

At step 313 the device attempts to register on the highest prioritized channel which has not been tried yet. If the registration attempt is not successful, as determined in step 315, then the next highest priority channel is selected for a registration attempt by going back to step 313. If the registration attempt in step 315 is successful, the device is now registered on a new data channel and the method proceeds to step 321 as discussed above.

Figure 4:
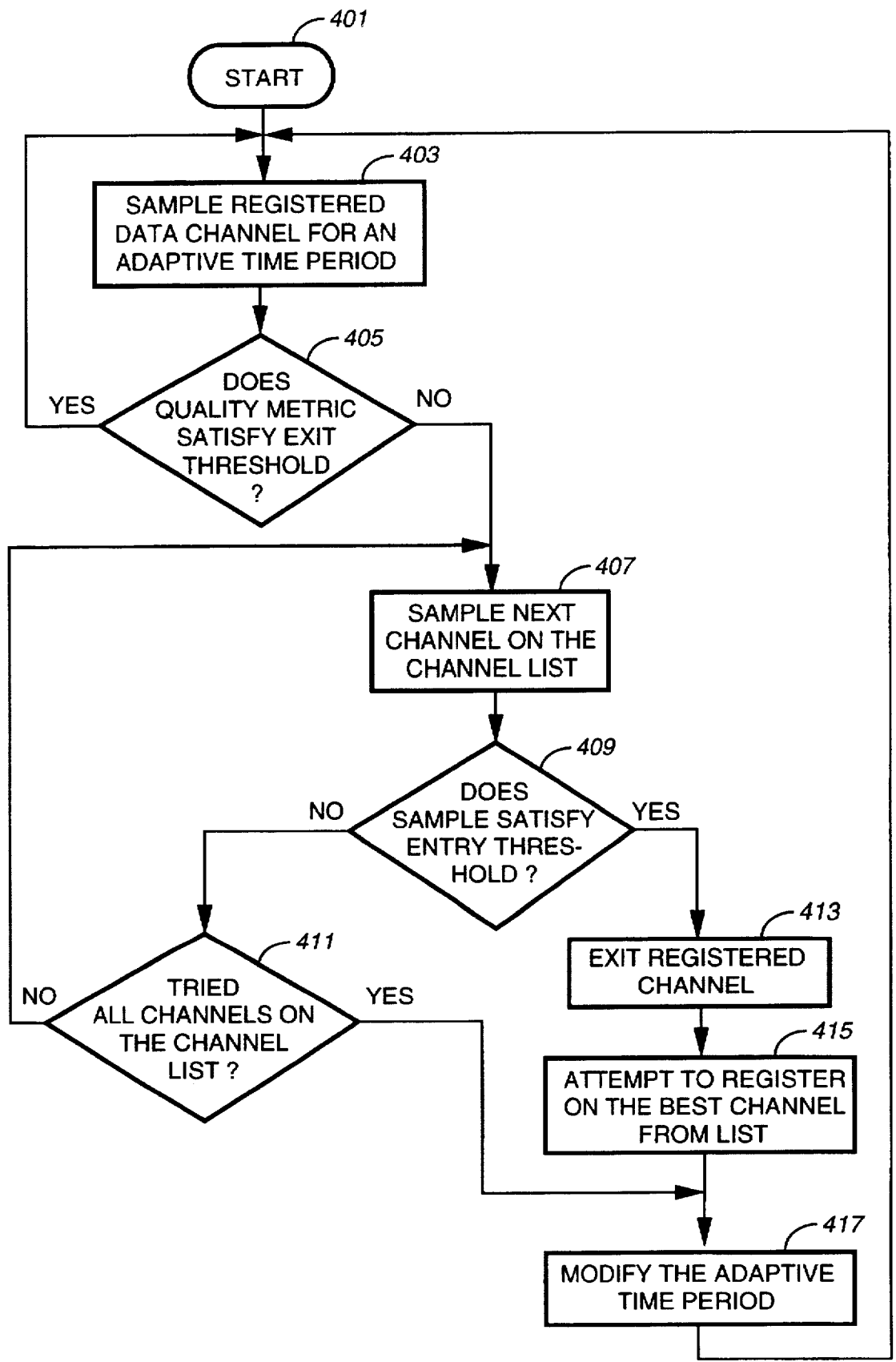
FIG. 4 is a flow chart of an alternative embodiment of a method of selecting a channel in accordance with the instant invention.

Referring to the FIG. 4 flow chart and starting at step 401, an alternative embodiment of a method of selecting another data channel on which to register in accordance with the instant invention will now be described. FIG. 4 contemplates a data communications system operating on a registered data channel and including an infrastructure and a subscriber terminal as depicted in FIG. 1. This method, at step 403, samples, preferably over a time period that may be an adaptable time period, the registered data channel to obtain a quality metric that may include signal strength, data quality and other channel attributes as discussed above. Next at step 405 the quality metric is compared to an exit threshold. So long as the exit threshold is satisfied step 403 is repeated.

If the exit threshold is not satisfied, indicating that the present registered data channel is no longer acceptable the method, beginning at step 407, quick scans sequentially a predetermined list of channels to provide a potential data channel with a signal strength value that satisfies a signal or entry threshold. Quick scanning includes step 407 where the next channel in the predetermined list is sampled followed by step 409 where the signal strength value is compared to the entry threshold and if the signal strength is not sufficient and all channels on the list have not been evaluated or sampled as tested at step 411 the method repeats step 407 using the next channel remaining on the list.

If the entry threshold is satisfied at step 409 the method exits the registered data channel at step 413. Thereafter at step 415, the method attempts to register on the best channel from the predetermined list using a procedure analogous to steps 305–315 discussed above. This includes scanning sequentially the predetermined list of channels and further forming for each of the predetermined list of channels a channel weight, preferably using a function of signal strength and other channel attributes or parameters including if available parameters from the infrastructure, and ranking the predetermined list of channels in accordance with the channel weight for each channel to provide a ranked list of channels; and then attempting to register sequentially on each of the ranked list of channels until an attempt to register is successful.

Figure 5:
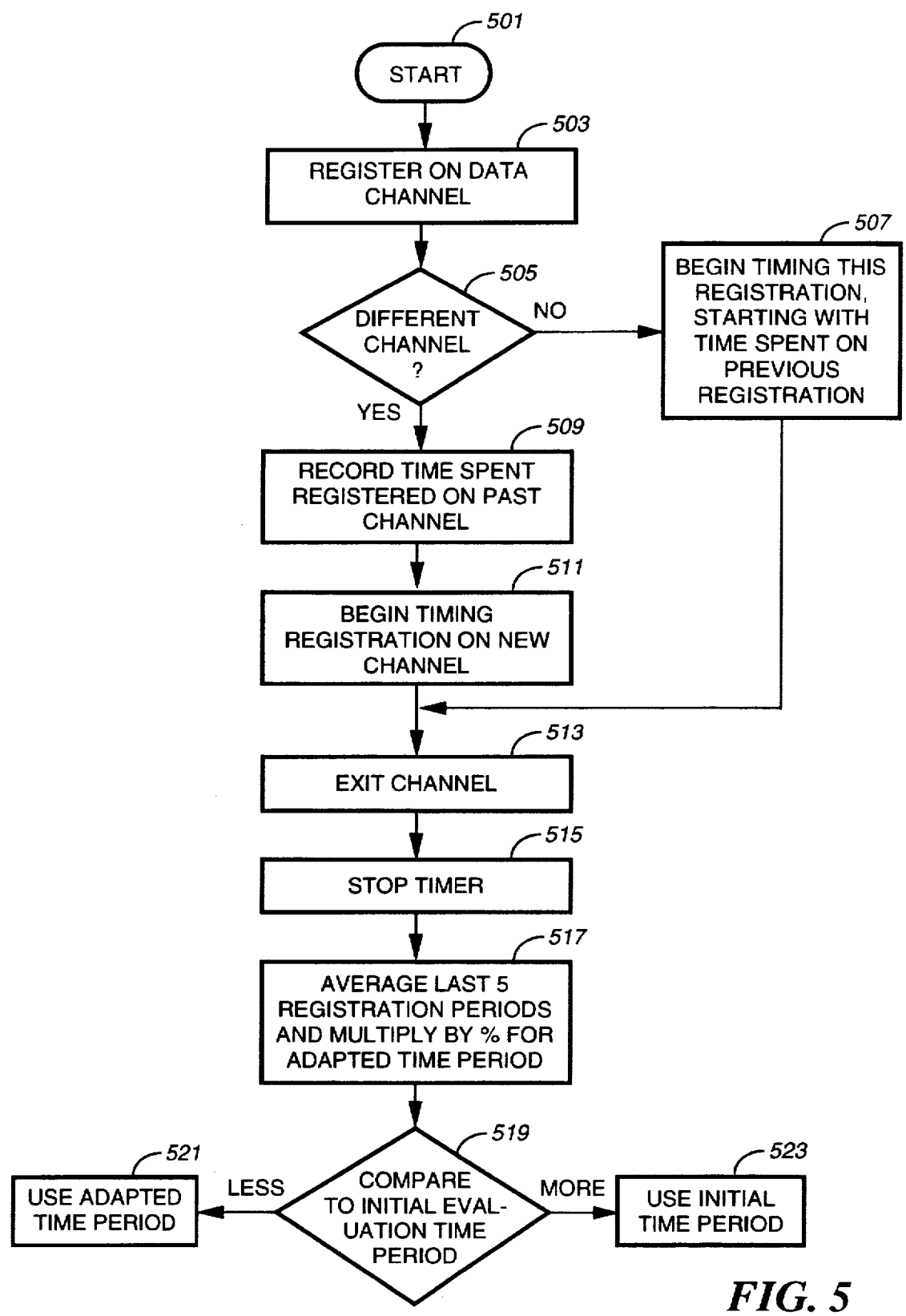
FIG. 5 is a flow chart of a method of determining an adaptive time period suitable for utilization in the FIG. 2, 3, or 4 methods.

Referring to the FIG. 5 flow chart, a method of determining an adaptive time period suitable for utilization in the methods of either FIG. 2, 3, or 4 will be discussed. FIG. 5 starts at step 501 and thereafter at step 503 the subscriber unit registers on a data channel. At step 505 the subscriber unit or terminal determines whether this registration is on new and different channel or has the unit registered on the same channel as previously. If this is not a new channel a channel occupation timer that measures the time the channel is occupied is started or restarted and time is added to a time already measured at step 507.

If this is a different and new channel, step 509 records the time spent registered on the past channel for subsequent use in determining an adaptive time period. The channel occupation timer is started from zero at step 511. After steps 507 or 511 the unit next exits the registered channel at step 513 after which the channel occupation timer is stopped at step 515.

Step 517 calculates the average registration time for past or previous registrations or the average time lapse between prior channel exit decisions or preferably an average of the last five such channel exit decisions and multiplies this average by a percentage that is configurable for a subscriber unit to provide an adapted time period. This percentage has been experimentally determined to be on the order of 10% for a quality time and greater, around 15%, for a signal time. It is expected that these percentages will vary dependent on the geographic layouts of a given system and may tend to increase as systems evolve toward smaller coverage zones and the average time of occupancy for a channel decreases. In any event at step 519 the adapted time period is compared to an initial time period, preferably set to 96 seconds for the signal time and 48 seconds for the quality time period. If the adapted time period is more than the relevant initial time period the initial time period is used, step 523, and if less the adapted time period is used, step 521, in the methods depicted in FIG. 2, 3, and 4.

While the methods depicted in FIG. 2, FIG. 3, and FIG. 4 of making a channel exit decision demonstrate preferred embodiments it will be clear to those of ordinary skill in the art that many variants within the true scope and spirit of the instant invention are possible. Such variants that provide the sought after advantages of the instant invention, including, for example, on average more credible exit decisions and the advantages that flow there from, such as more reliable service, improved battery life and increased system capacity, will likely depend on the specific time periods used for evaluating a channel. As one of but two examples, consider a subscriber terminal that routinely and frequently interacts with the system and very seldom changes coverage areas or zones. The time periods discussed above appear to work quite well and could likely be lengthened for such a unit.

In contrast consider a subscriber unit that routinely operates on the fringe area of two or three different coverage areas or zones. For such a unit it may well be that the time periods above should be shortened for optimum performance. The optimum time periods for a specific subscriber or perhaps even a specific system may thus be dependent on the actual usage patterns that are circumstance dependent. All such variants that take advantage of the channel exit decision methods for subscriber units as taught by the instant invention are considered to be within the true scope and spirit of the same.

It will be appreciated by those of ordinary skill in the art that the methods disclosed provide various advantageous methods of making channel exit decisions at a subscriber unit operating in a data communications channel. These inventive methods may be readily and advantageously employed in a subscriber terminal or other communications device or system to minimize the frequency of unnecessary or inaccurate channel exit decisions on a unit by unit basis, without otherwise sacrificing network service characteristics. Hence, the present invention, in furtherance of satisfying a long-felt and growing (given the proliferation of data systems and thus potential operating channels) need for improved channel exit decision making, provides an exemplary method of making such decisions that significantly reduces the frequency of incorrect decisions for many terminals.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A method of making a channel exit decision at a subscriber terminal comprising the steps of:

sampling a registered data channel for a time period to obtain a plurality of quality values;

comparing said plurality of quality values to a threshold; and initiating a channel exit procedure when a first number of said plurality of quality values obtained during said time period does not satisfy said threshold, wherein said time period is determined as a function of at least a plurality of prior channel exit decisions.

2. The method of claim 1 further including the step of starting a timer set to lapse after said time period when any one quality value from said plurality of quality values does not satisfy said threshold.

3. The method of claim 2 further including the step of resetting said timer when a second number of said plurality of quality values does satisfy said threshold.

4. The method of claim 3 wherein said step of resetting said timer further includes setting said timer to an adaptable time period.

5. A method of making a channel exit decision at a subscriber terminal comprising the steps of:

sampling a registered data channel for a time period to obtain a plurality of quality values;

comparing said plurality of quality values to a threshold;

starting a timer set to lapse after said time period when any one quality value from said plurality of quality values does not satisfy said threshold, wherein said step of setting said timer further includes setting said timer to a function of a time lapse between prior channel exit decisions; and initiating a channel exit procedure when a first number of said plurality of quality values obtained during said time period does not satisfy said threshold wherein said time period is determined as a function of at least a plurality of prior channel exit decisions.

6. The method of claim 1 where in said step of initiating includes a step of scanning for another data channel.

7. The method of claim 6 wherein said step of scanning for another data channel further includes;

sampling said another data channel to provide another quality value;

comparing said another quality value to an entry threshold; and exiting said registered data channel when said another quality value satisfies said entry threshold.

8. The method of claim 7 further including a step of registering on a new data channel.

9. The method of claim 1 wherein said step of sampling the registered data channel further includes sampling the data channel to provide a plurality of signal strength values within an adaptive signal time period and to provide a plurality of data quality values within an adaptive quality time period.

10. The method of claim 9 wherein said adaptable quality time period is a function of a time lapse between prior channel exit decisions.

11. The method of claim 9 wherein said step of comparing further includes comparing each of said plurality of signal strength values to a signal threshold and each of said plurality of data quality values to a data threshold.

12. The method of claim 11 wherein said step of initiating an exit procedure further includes initiating an exit procedure when a first predetermined number of said plurality of signal strength values does not satisfy said signal threshold and providing another plurality of signal values when a second predetermined number of said plurality of signal strength values does satisfy said signal threshold.

13. The method of claim 12 wherein said step of initiating an exit procedure further includes initiating an exit procedure when a third predetermined number of said plurality of data quality values does not satisfy said data threshold and providing another plurality of data quality values when a fourth predetermined number of said plurality of data quality values does satisfy said data threshold.

14. The method of claim 13 where in said step of initiating includes a step of scanning for another data channel.

15. The method of claim 14 wherein said step of scanning for another data channel further includes;

sampling said another data channel to provide another quality value;

comparing said another quality value to an entry threshold; and exiting said registered data channel when said another quality value satisfies said entry threshold.

16. The method of claim 15 wherein said step of exiting said registered data channel includes registration on a new data channel.

17. The method of claim 16 wherein said step of registering on a new data channel further includes;

scanning a list of data channels including;

forming a weighted quality value corresponding to each channel on said list of data channels, prioritizing said each channel in accordance with said weighted quality value to form a prioritized channel list, and initiating a registration procedure on a first priority channel from said prioritized channel list.

18. The method of claim 17 wherein said step of initiating a registration procedure further includes;

attempting to register on said first priority channel, and re attempting to register on a next lower priority channel when said attempting to register is unsuccessful.

19. A method of making a channel exit decision at a subscriber terminal comprising the steps of:

sampling a registered data channel for a time period to obtain a plurality of quality values;

comparing said plurality of quality values to a threshold; and initiating a channel exit procedure when a first number of said plurality values obtained during said time period does not satisfy said threshold wherein said time period is determined as a function of at least a plurality of prior channel exit decisions wherein said step of sampling uses an adaptable signal time period that is a function of a time lapse between prior channel exit and the step of sampling also uses the adaptable signal time period that is a function of a number of prior channel exit decisions.

20. A method of selecting at a subscriber terminal another data channel to register on comprising the steps of:

sampling the registered data channel to obtain a quality metric wherein the step of sampling is adjusted based on a history of a user;

comparing said quality metric to an exit threshold;

quick scanning, when said quality metric does not satisfy said exit threshold, sequentially a predetermined list of channels to provide a potential data channel with a signal strength value that satisfies a signal threshold;

exiting said registered data channel;

scanning sequentially said predetermined list of channels further including forming for each of said predetermined list of channels a channel weight and ranking said predetermined list of channels in accordance with said channel weight for each channel to provide a ranked list of channels; and attempting to register sequentially on each of said ranked list of channels until an attempt to register is successful.

21. The method of claim 20 wherein said step of sampling to obtain a quality metric further utilizes an adaptable time period.

22. The method of claim 21 wherein said step of sampling to obtain a quality metric further utilizes said adaptable time period as a function of a time lapse between prior subscriber unit registrations.

23. The method of claim 20 wherein said step of forming said channel weight utilizes a function of signal strength for a corresponding channel.

24. The method of claim 23 wherein said step of forming said channel weight further utilizes a function of other channel parameters.

25. The method of claim 24 wherein said step of forming said channel weight further utilizes said other channel parameters including characteristics received from the infrastructure.

26. A method of making a channel exit decision at a subscriber terminal including the steps of:

sampling a channel for a time period to obtain a plurality of signal strength values;

comparing said plurality of signal strength values to a threshold; and initiating a channel exit procedure when a first number of said plurality of signal strength values obtained during said time period does not satisfy said threshold, wherein said time period is determined as a function of at least a plurality of prior channel exit decisions.

* * * * *